Jan. 2, 1923.
W. A. VINSON.
DEVICE FOR MANUFACTURING RADIALLY CORRUGATED SHEET METAL DISKS.
ORIGINAL FILED JAN. 23, 1917.
1,440,709.
3 SHEETS—SHEET 2.
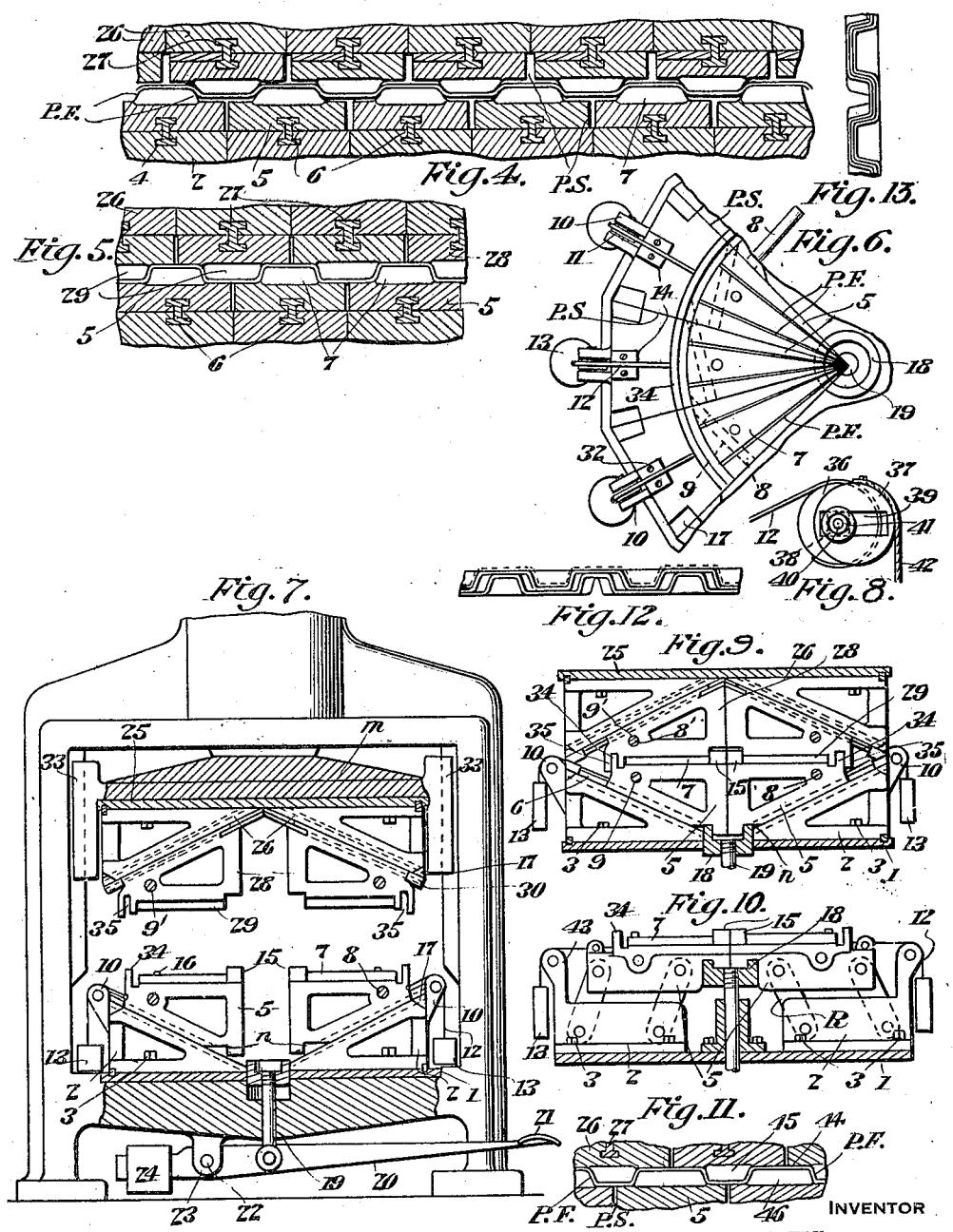
WITNESSES
INVENTOR
William A. Vinson
BY Victor J. Evans
ATTORNEY Jan. 2, 1923.
W. A. VINSON.
DEVICE FOR MANUFACTURING RADIALLY CORRUGATED SHEET METAL DISKS.
ORIGINAL FILED JAN. 23, 1917.
1,440,709.
3 SHEETS—SHEET 3.
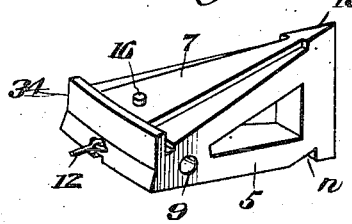
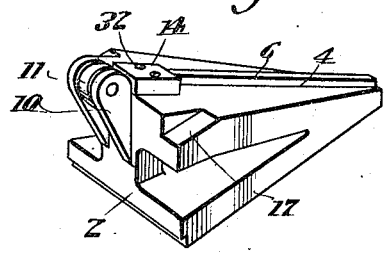
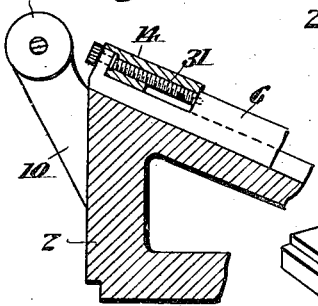
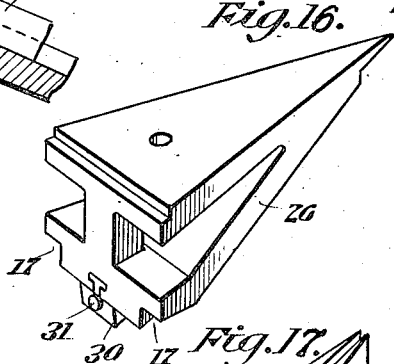
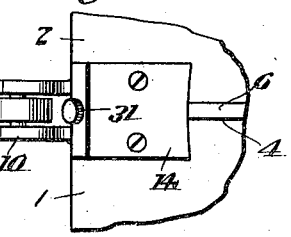
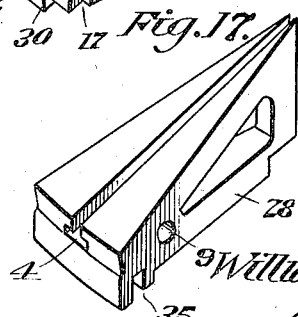
WITNESSES
INVENTOR
William A. Vinson
BY Victor J. Evans
ATTORNEY Patented Jan. 2, 1923.

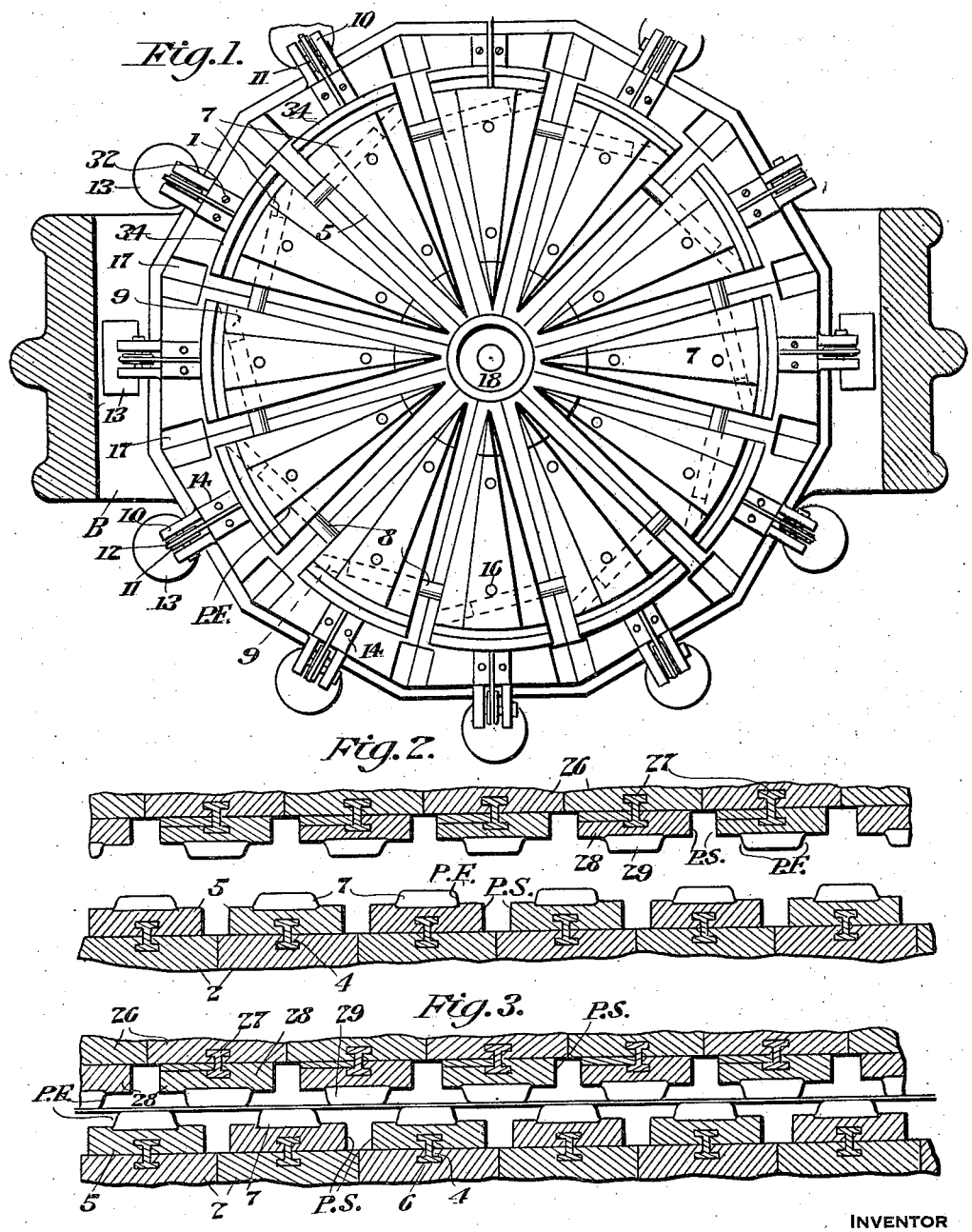

1,440,709

UNITED STATES PATENT OFFICE.

WILLIAM A. VINSON, OF BALTIMORE, MARYLAND.

DEVICE FOR MANUFACTURING RADIALLY-CORRUGATED SHEET-METAL DISKS.

Application filed January 23, 1917, Serial No. 143,963. Renewed June 7, 1922. Serial No. 566,544.

*To all whom it may concern:*

Be it known that I, WILLIAM A. VINSON, a citizen of the United States, residing at Baltimore, in the county of Baltimore City and State of Maryland, have invented new and useful Improvements in Devices for Manufacturing Radially-Corrugated Sheet-Metal Disks, of which the following is a specification.

This invention relates to improvements in devices for manufacturing radially corrugated sheet metal disks, such as are designed to be employed in the manufacture of automobile car, railway car and other vehicle wheels, in which the radially corrugated disk or disks form the center or spoke portions of the wheel, and particularly to disks provided with radial corrugations or indented ribs extending from the center to the periphery of the disk, wherein the convolutions forming the corrugations are substantially of the same depth throughout.

In the manufacture of radially corrugated disks of this character difficulties are encountered in forming the corrugations, owing to the fact that a disk with a central opening and primarily of excess diameter must be employed, for the reason that in the formation of the corrugations the disk is contracted radially and circumferentially, the completed corrugated disk being, owing to the displacements of the metal forming the corrugations, of much less diameter than the ordinary disk or blank from which it is made. In making corrugated disks of this character with corrugations it has heretofore been found impossible to make the disk in a single operation, or to stamp more than a single corrugation at a time, owing to the fact that under previous methods and previous devices it had been found impossible to obtain a stamping action permitting of the formation of all of the corrugations simultaneously, due to the impossibility of securing proper shrinkage or contraction of the disk during the stamping operation. It has therefore been found necessary with previous methods and apparatus to construct the disk by forming the corrugations successively by different operations, which mode of manufacture has serious defects in that making a single corrugation at a time warps the material into an irregular cone, thereby setting up more or less permanent distortions and irregularities, whereby the corrugations are diverted from true radial lines and a disk of oblong instead of circular form produced, which irregularities can not be wholly corrected by the customary process of using finishing dies, the result being that a form of disk is produced which is inaccurate and incapable of being fitted to a hub and rim and felly without trouble and difficulty or in a quick and accurate manner.

It is found also that when corrugations are formed in rolled sheets of metal, the material either stretches or shortens in given places, according to the direction of the corrugations as regards the grain of the rolled metal, which in the processes of manufacture heretofore employed causes the production of a disk of elliptical form, which is elongated laterally to the grain of the metal, in some cases to a considerable extent.

Furthermore, it has been found that punching the metal into a female die by a male member or punch is objectionable in that the metal is dragged over the corners of the female die, whereby the metal is first kinked over the corners and then straightened out into the lateral walls of the corrugation, causing injury to the metal and wear upon the dies, and also undue stretching of the lateral walls of the corrugation when the metal is held more or less firmly by the dies, so that a disk of more or less variance in thickness and weak at one or more points is produced.

In the use of such dies and punches the portion of the metal which is to form the bottom of the corrugation is caused to bulge ahead of the male member of the die until it strikes the bottom of the forming cavity in the female member, at which time the metal slips back around the corners of the male member of the die in order to form part of the lateral walls of the corrugation. The result is that when the metal becomes more or less firmly held by the dies as the corrugation nears completion the bulging metal is either compressed or is buckled into radial creases, which are not only detrimental to the strength of the disk and reduces the circumference of the disk, while tending to distort it into a cone of irregular form, but which mars the appearance of the wheel and adds to the difficulties of assembling the disk and hub.

The object of the present invention is to provide a novel construction of dies or forming members, and a novel mode of manufacture, whereby the disks are formed by radial folding instead of punching in such a manner as to enable the same to be operated by means of a punch press, and further to provide a construction of dies, and mode of manufacture, whereby all of the corrugations may be simultaneously produced, thus eliminating a number of steps and a material amount of labor and time, with the result of producing a corrugated disk at much less cost.

A further object of the invention is to provide an apparatus, and mode of manufacture, whereby disks of geometrically symmetrical form may be produced without the necessity of employing finishing dies.

A still further object of the invention is to provide an apparatus, and method of operation, whereby the corrugations may be formed simultaneously in a novel and prescribed manner, to secure the aforesaid results.

A still further object of the invention is to provide an apparatus, and method of manufacture, whereby all slipping of the metal over the corners of the forming teeth of the dies, all stretching of the metal in the lateral walls of the corrugations, and all compression or buckling of the bottom walls of the corrugations during the process of formation will be reduced to the minimum, and a corrugated disk of true form and maximum strength, durability and resiliency will be produced.

A still further object of the invention is to provide an apparatus, and mode of manufacture, whereby an improved construction of disk may be produced having corrugations the ribs of which are of different width from the grooves, so that two or more of the disks may be assembled into the same wheel and lie in contact with each other, to produce a multiple-disked wheel of sufficiently great strength and durability for use in heavy truck or car wheels.

A still further object of the invention is to provide an apparatus, and method of manufacture, whereby disks of the character described may be rapidly and conveniently formed through the action of an ordinary punch press, thus enabling disks to be produced in greater quantities at a much lower cost than has been possible with the constructions and methods of manufacture heretofore in use.

With these and other objects in view the invention consists of the features of construction, combination and arrangement of parts hereinafter fully described and claimed, reference being had to the accompanying drawings in which:—

Figure 1 is a plan view of the lower half of the die and its mountings, showing the geometrical form of a die suitable in this instance for making a disk of twelve corrugations, and showing its position on the bed of a suitable press machine.

Figure 2 is a peripheral projection in section of a number of the dies, showing the same in relative position when the device is open ready to receive a disk to be corrugated.

Figure 3 is a similar view showing a disk fitted in position between the dies, in readiness for the stamping operation.

Figure 4 is a similar view showing the stamping operation partially completed.

Figure 5 is a similar view showing the final step in the stamping operation.

Figure 6 is a fragmentary plan view showing the dies in the position they assume at the completion of the stamping operation.

Figure 7 is a sectional elevation of a complete apparatus embodying my invention, as employed in a press, such as a hydraulic press.

Figure 8 is a detail view of a tensioning device.

Figure 9 is a view of the dies of Figure 7 in closed position.

Figure 10 is a view similar to Figure 9 showing a modified form of construction.

Figure 11 is a view similar to Figure 5, illustrating the modified form of dies for producing the modified form of disk.

Figure 12 is a peripheral projection showing two such disks assembled.

Figure 13 is a similar view showing the assemblage of more than two disks to form a wheel of maximum strength and durability, such as a railway car wheel.

Figures 14 to 19 are views showing in detail the construction of parts of the apparatus.

On a suitable assembling plate 1 are arranged suitable supports or mounting members 2. These mounting members in this particular construction are assembled in such a way and are so shaped as to form an isosceles concave pyramid having the vertex at the center of the assembling plate to which the mountings are secured by bolts or other means 3. It is generally preferable to have all these mountings of the same central angle. In the upper surface of each of these mounting members is milled a T-slot 4 in such a position that it bisects the central angle of the inclined surface.

On each of the said mounting members is fitted a die or jaw 5 with a slot in its bottom to receive a guide 6, and is slidably fitted to the guide and mounting with the guide bisecting the central angle of its base.

which should have the same central angle as the mounting members. The top surfaces of the dies are machined off the same height and so that they are parallel to the assembling plate. Figures 1 and 6 respectively show these dies in position in plan. Each of these dies or jaws is fitted with a radially disposed angular tooth 7 whose central angle is generally equal to one-half (approximately) the central angle of the die, and all of which should be the same height. The planes of the sides of the mounting members and of the dies which meet the adjacent mounting member or die respectively are herein called the planes of separation, and should be perpendicular to the assembling plate and to the top of the dies.

On one side of each of the dies is arranged a guide post 8 perpendicular to the plane of separation, consequently parallel to the assembling plate and the tops of the teeth and dies. Each of these guide posts extends into a hole 9 in the adjacent die which is also perpendicular to the plane of segregation and parallel to the tops of the teeth and dies and to the assembling plate. Each plane of separation on the dies is thus crossed by a guide post which holds the points of all of the dies at equal distance from the center and they slide in and out according as the dies move toward or from the center respectively. They act to prevent any one or more of the dies from having any radial motion without all of them being moved radially the same distance at the same time synchronously.

On the outer end and on the upper part of each of the mounting members is a suitable bracket or ears 10 to receive a roller 11 mounted therein. A chain or other flexible part 12 is attached at one end to the outer end of each of the dies and passes over the roller and to the other end is attached a weight or spring or other means 13, whereby the dies are drawn radially up the inclined surface of the mounting member until the outer ends of the dies come against adjustment blocks 14 suitably formed and placed so that all of the dies are stopped by and rest against them. They are for the purpose of limiting the amount of opening or radial drawing that the weights or springs 13 impart to the dies. These blocks may be set to any desired distance from the center within the radial capacity of the mounting members. The deeper the corrugation that the device is to make the greater is the radial motion of the teeth and dies hence the necessity for this adjustment.

A small portion 15 of the central end of the teeth 7 should be of the same central angle as the die and should extend a short distance above the top of the tooth to form a lug for preventing the metal from slipping on the teeth radially toward the center during the folding of the metal. These lugs are for the further purpose of giving resistance to the draw of the weights or springs 13 so as to keep the metal under a radial tension, taut, and by increasing or decreasing the weights or strength of the springs the metal may be held suitably taut so as to prevent stretching of the metal as well as to prevent it from bulging ahead of the middle portion of the teeth to such an extent that the teeth and dies would stretch the lateral walls of the corrugations or compress or buckle the metal, as shown in and explained with reference to Figures 7 and 8 respectively. These points of stretching and buckling are indicated by the letters (s) and (b) respectively. Where thick strong metal is being pressed the device may at times show a tendency to let the dies and teeth slide ahead of the metal radially provided the weights or the strength of the springs 13 are not sufficient to hold them. To prevent such an accidental slipping suitable lugs or pins 16 are provided which engage the periphery of the disk and insure that the disk and the forming teeth shall move together.

At the corners of the mounting members a small recess 17 may be necessary to allow for the adjustment block on the upper parts of the device when it is closed closely in the operation.

In the bottom of all of the lower dies near the central point is milled a nitch $n$ such that when the dies are closed they are all caught by a suitable circular latch 18. This circular latch is mounted on the upper end of a vertical shaft or pin 19, which is connected at its lower end to a foot lever comprising a shank 20, a foot plate 21 and a fulcrum 22 in downwardly projecting brackets 23 which are secured to the bed B of the press, the shaft 19 passing through the said bed of the press. A weight 24 or other means is provided and is placed as to hold the shaft 19 and latch 18 thrust upward in readiness to catch the dies and hold them in a central position when they close. This is for the purpose of allowing the upper dies of the forming device to raise and allow the operator to remove the corrugated disk without the lower dies tending to open and hold or distort the disk. When the disk is removed the operator may release the latch by depressing the lever 20—21 and the weights 13 will open the lower dies. Figures 11 and 12 show this latch so holding the dies centrally.

The upper portion of this device comprises an assembling plate 25 on which are secured mounting members 26 all of which form an inverted concave pyramid, the vertex of which lies in a line perpendicular to the assembling plate 1 at the vertex of the lower concave pyramid attached to it. These members 26 are of the same number as the mounting members 2 and should be of the same central angle, and the assembling plate 25 upon which they are mounted should be kept by the press parallel to the assembling plate 1.

In the lower or inclined surface of each member 26 is milled a T-slot which bisects the central angle. This slot is to receive a channeled guide 27 slidably fitted into a similar slot in the upper surface of a die 28 similar in general to the previously mentioned dies 5. These upper dies slide toward the periphery of their own weight. All of these dies 28 are machined off on their lower surface so that they are in approximately the same plane and parallel to the assembling plate 25. In the side of each of these upper dies is secured a guide post 8' and in the adjacent die hole 9' both of which are perpendicular to the plane of separation exactly similar to those of the lower dies and operate in a similar way to insure the synchronous radial motion of all of the dies.

To each of these upper dies is attached a suitable tooth 29, all of which are the same height and extend radially with the bisector of its central angle in the same plane as the bisector of the central angle of the jaw on which it is mounted, and of such a central angle that the sum of the central angles of one upper tooth and one lower tooth is equal to the central angle of one die. The point of each upper tooth and a small portion of the die is removed to receive the lugs 15 on the lower teeth.

The channel shaped guides in the inclined surface of the upper dies allows the dies to move radially and be supported by the T-guides which is also used as a means of holding the adjustment blocks 30 which are adjusted by means of screws 31 and fastened by bolts 32 similar to the adjustment and fastening of the blocks 14.

The upper and lower assembling plates are secured in a suitable pressing device, the lower assembling plate being secured to the bed B and the upper assembling plate to the moving part *m* of the press. The guides 33 of the press ensures a proper meeting of both assemblages of dies, etc.

The upper and lower dies are secured in the press in such a position that the upper teeth and the lower teeth alternate, the planes of the sides of each tooth being parallel to the plane of the side of the adjacent tooth in every instance around the whole set. This is accomplished by fitting the teeth together and then bringing the moving part of the press down onto the upper assemblage plate and fastening it thereto while the jaws are closed, as shown in Figures 11 and 12. In this position the planes of separation of the lower dies bisect the upper dies and the planes of separation of the upper dies bisect the lower dies, consequently all the planes of separation terminate in the bisection of a tooth on the opposite set of dies.

The planes which divide the intermeshing upper and lower teeth are herein called the planes of folding and are marked (PF) and the planes of separation are marked (PS).

On all the lower dies at equal distances from the center measured along the planes of folding (where the central angle of the tooth equal $\frac{1}{2}$ of the central angle of the die) are upwardly extending tongues 34, the vertical walls of which are perpendicular to the plane of the top of the die and perpendicular to the plane of folding of the tooth. Thus on either side of the bisector of the jaw extends this upwardly extending tongue. It should extend upwardly a short distance above the top of the highest teeth that are to be used on the dies.

On each upper jaw is formed downwardly projecting ribs or tongues 35, the space between them being so formed and located as to receive the tongue 34 on the lower die. This groove on each die is also an equal distance from the center as measured similar to the above mentioned tongue and its interior walls are milled perpendicular to the base of the assembly plate and to the planes of folding where the central angle of the tooth is equal to one-half of the central angle of the die in this instance. Thus as the dies close and move in a radial direction the tongue 34 slides in the groove 35 and the grooved guide slides in the opposite direction upon the corrugated disk. When the device opens to allow the finished disk to be removed the grooved guides raise vertically off the tongue and the upper dies slide open as they raise.

These tongue and grooved guides are for the purpose of preventing the upper or lower set of dies and teeth from moving radially faster or slower than the other set or than the metal of the disk and prevents any of the dies or teeth from moving in any other way than that which carries the metal of the disk straight to where it belongs without slipping on the teeth. Figures 9 and 10 show the fitting of the tongue and groove guides as they fit when the device is closed. These three guides in conjunction with those which cross the planes of separation insure the synchronous radial motion of all of the segments of a segregated folding device.

In Figure 8 is shown a form of roller which is composed of two members 36 and 37 respectively, a square portion 38 on the part 36 is fitted into a slot 39 in the part 37 so that the part 37 may be made to run eccentric with regard to the shaft 40 on which the part 36 is axially mounted. A nut 41 threaded to the part 36 holds the part 37 in any desired position of adjustment. Each weight or spring 13 is attached to the cord or chain 42 which is attached to the part 37 and thus made to exert a different amount of radial tension on the metal at different stages of the corrugation if so desired, since it requires less radial tension as the folding nears completion.

Figure 10 shows how the mounting members may be provided with rockers R, instead of the inclined surfaces and which may be snugly but movably fitted into suitable retaining bearing parts and made to hold the dies in their proper plane of motion previously described. Either the upper or lower dies may be so mounted or both since the fitting of the teeth guides, etc., are the same. In this form of mounting the mounting member itself may be shifted radially to adjust the device for making corrugations of different depths which require greater or less motion according to the greater or less depth of corrugation, respectively. The outer ends of the dies may rest against the brackets 43 when opened which serve the same purpose as the blocks 14.

In Figure 11, 44 is the periphery of a disk formed by means of teeth 45 of the upper dies being of a different central angle, in this instance smaller, than the teeth 46 of the lower dies. Figure 12 is a peripheral projection of two such disks 47 and 48 respectively assembled into the same wheel, the small corrugations of each disk jutting between the small corrugation of the other, thus producing a wheel of superior strength and resilience. Figure 11 may be taken to represent also the peripheral projections in section of a disk and the device where the disk is corrugated with the upper teeth being displaced toward the periphery and the teeth of the lower jaws displaced centrally, but both the teeth of the upper jaws and the teeth of the lower jaws being of the same central angle, thus making the grooves of one side of the disk wider than the ribs.

Figure 13 is a peripheral projection of three disks fitted together to be assembled into one wheel. This fitting is done by the above mentioned radial displacement of the teeth. Where an odd number of disks are assembled into this way the middle one may have its corrugations of equal width and angular measurements, but not essentially so. Other disks may be so fitted to this multiple disk by the further radial displacement of the teeth so as to produce a wheel of any desired strength and yet have a certain degree of resilience. Car wheels of great strength may be built up in this way and still be light as compared to those now in use and at a much less cost in the long run.

Where the teeth of the upper and lower dies are of different central angles they also may be radially displaced as previously described and be made to produce disks to fit those already made with similar corrugations.

I claim:—

1. In a device of the class described, a series of dies, means for mounting the dies and permitting movement each in the direction of its longitudinal axis toward and from a common center, the dies maintaining a horizontal position, a movable head, and means carried thereby cooperating with the dies, the working faces of the dies having converging edge portions.

2. In a device of the class described, a series of dies, means for mounting the dies, and permitting movement each in the direction of its longitudinal axis toward and from a common center the dies maintaining a horizontal position, a movable head, and a series of dies carried by the head, the working faces of the dies having converging edge portions.

3. In a device of the class described, a series of dies, means for mounting the dies and permitting movement each in the direction of its longitudinal axis toward and from a common center, the dies maintaining a horizontal position, a movable head, a series of independently movable dies carried by the head and alternating in position with reference to the dies of the series first named, the working faces of the dies having converging edge portions.

4. In a device of the class described, a series of dies radiating from a common center and movable each in the direction of its longitudinal axis toward and from the center, the dies maintaining a horizontal position, said dies having tapering faces, and a second series of dies, the dies of the series last named alternating in position with those of the series first named, the working faces of the dies having converging edge portions.

5. In a device of the class described, a series of dies movable each in the direction of its longitudinal axis toward and from a common center, the dies maintaining a horizontal position, a second series of dies similarly movable, the dies of the second series alternating with those of the series first named, the working faces of the dies having converging edge portions.

6. In a device of the class described, a series of dies movable each in the direction of its longitudinal axis toward and from a center, the dies maintaining a horizontal position, a second series of dies similarly movable, the dies of the second series alternating with those of the first series, and all of the dies having tapering faces, the working faces of the dies having converging edge portions.

7. In a device of the class described, a series of dies movable each in the direction of its longitudinal axis toward and from a center, the dies maintaining a horizontal position, means for holding the dies normally spaced from the center, and a series of dies cooperating with those first named, the working faces of the dies having converging edge portions.

8. In a device of the class described, a series of dies movable each in the direction of its longitudinal axis toward and from a center, the dies maintaining a horizontal position, means for holding the dies normally spaced from the center, a series of dies cooperating with those first named, and mounting means for the cooperating dies permitting movement thereof away from a common center to an inoperative position, the working faces of the dies having converging edge portions.

9. In a device of the class described, a series of dies and means for mounting the dies permitting movement each in the direction of its longitudinal axis, when under pressure from above, toward a common center, the dies maintaining a horizontal position, and a second series of dies cooperating with those first named, the working faces of the dies having converging edge portions.

10. In a device of the class described, a series of dies and means for mounting the dies permitting movement when under pressure from above, toward a common center the dies maintaining a horizontal position, and a second series of dies cooperating with those first named, and mounting means for the dies of the second series comprising a series of converging guiding elements, the working faces of the dies having converging edge portions.

11. In a device of the class described, a plurality of series of dies, means for mounting the dies, of one series and causing them to move toward and from the dies of the other series, all of the dies being movable radially with reference to the axis of the mounting means, the dies maintaining a horizontal position, the working faces of the dies having converging edge portions.

12. In a device of the class described, a series of dies having longitudinally tapering work engaging faces extending radially from a common center, a support therefor including means for permitting motion of said dies parallel to themselves toward and from the common center, a movable head, and dies on said head for cooperation with said first named dies, the dies maintaining a horizontal position.

13. In a device of the class described, a plurality of series of dies each having longitudinally tapering work engaging faces, the dies of each series converging toward a common center and mounted to move toward said center during their working stroke, the dies maintaining a horizontal position.

14. In a device of the class described, a plurality of series of dies each having longitudinally tapering work engaging faces, the dies of each series converging toward a common center and mounted to move toward said center during their working stroke, the dies maintaining a horizontal position, the mounting means for the dies permitting movement of the dies of each series from the center when disengaged from the work.

15. In a device of the class described, a series of dies, mounting means therefor, the dies being movable toward a common center, the dies maintaining a horizontal position and the mounting means being inclined with reference to the working faces of the dies, and dies cooperating with those first named, the working faces of the dies having converging edge portions.

16. In a device of the class described, a series of dies spaced apart when in inoperative position, and movable during operation toward a common center, the dies maintaining a horizontal position, mounting means for the dies, the mounting means including members inclined with reference to the working faces of the dies, and a second series of dies cooperating with those first named, the working faces of the dies having converging edge portions.

17. In a device of the class described, a series of dies, mounting means therefor, the dies being movable toward a common center, while maintaining a horizontal position, and the mounting means being inclined with reference to the working faces of the dies, and dies cooperating with those first named, the cooperating dies alternating with the dies first named so that the edges of their working faces will assume a position substantially parallel with the edges of the working faces of the dies first named.

18. In a device of the class described, a series of dies, mounting means therefor, the dies being movable toward a common center while maintaining a horizontal position and the mounting means being inclined with reference to the working faces of the dies, and dies cooperating with those first named, each of the dies including elements projecting beyond the major portion of the working faces, the projecting elements of the lower dies interlocking with those of the upper dies.

In testimony whereof I affix my signature.

WILLIAM A. VINSON.